(12) United States Patent
Hassler

(10) Patent No.: US 10,513,219 B1
(45) Date of Patent: Dec. 24, 2019

(54) HITCH MOUNTED LIGHT ASSEMBLY

(71) Applicant: Howard Hassler, Sour Lake, TX (US)

(72) Inventor: Howard Hassler, Sour Lake, TX (US)

( * ) Notice: Subject to any disclaimer, the term of this patent is extended or adjusted under 35 U.S.C. 154(b) by 0 days.

(21) Appl. No.: 16/138,164

(22) Filed: Sep. 21, 2018

(51) Int. Cl.
*B60Q 1/30* (2006.01)
*B60D 1/62* (2006.01)
*B60Q 7/02* (2006.01)

(52) U.S. Cl.
CPC ............... *B60Q 1/305* (2013.01); *B60D 1/62* (2013.01); *B60Q 7/02* (2013.01)

(58) Field of Classification Search
CPC ............ B60Q 1/305; B60Q 7/02; B60D 1/62
See application file for complete search history.

(56) References Cited

U.S. PATENT DOCUMENTS

| 6,827,363 B1 * | 12/2004 | Amerson | B60D 1/36 280/477 |
| 6,886,968 B1 * | 5/2005 | Hamelink | B60D 1/58 280/163 |
| 2004/0156205 A1 * | 8/2004 | Pisciotti | B60Q 1/305 362/485 |
| 2006/0208867 A1 * | 9/2006 | McLoughlin | B60Q 1/32 340/472 |
| 2016/0167568 A1 * | 6/2016 | Salami, Jr. | B60Q 1/0035 362/523 |
| 2016/0347247 A1 * | 12/2016 | Espey | B60Q 1/2657 |
| 2017/0114966 A1 * | 4/2017 | McCurdy | B60D 1/58 |

* cited by examiner

*Primary Examiner* — Mariceli Santiago
(74) *Attorney, Agent, or Firm* — Law Office of Jeff Williams PLLC; J. Oliver Williams

(57) ABSTRACT

A hitch mounted light assembly includes a mount configured to releasably communicate with a hitch of the vehicle. The assembly is configured with a set of traffic lights intended for the use on the rear of the vehicle. The traffic lights pivot outward and upward from a vertical bar in communication with the mount. The elevation of the lights is adjustable. The assembly is configured to transition between a storage configuration and an expanded configuration intended for use. The traffic lights are operable through a conventional trailer plug on the vehicle.

16 Claims, 6 Drawing Sheets

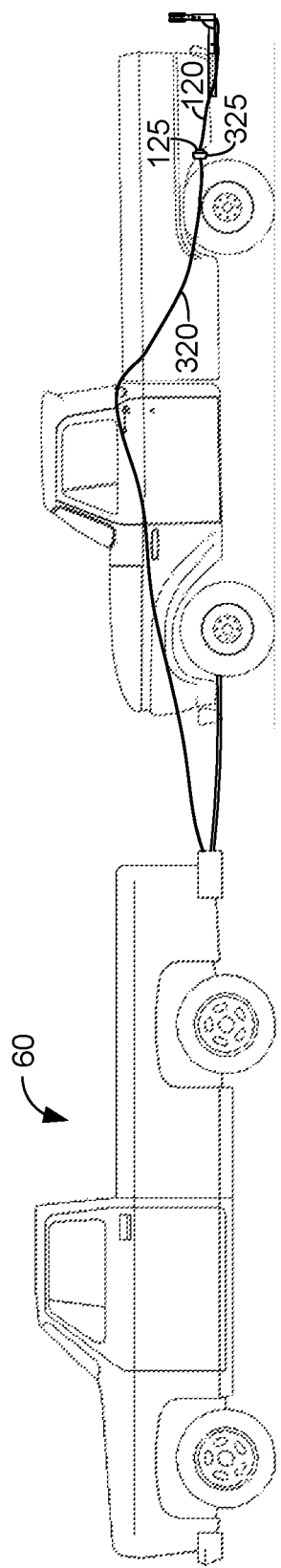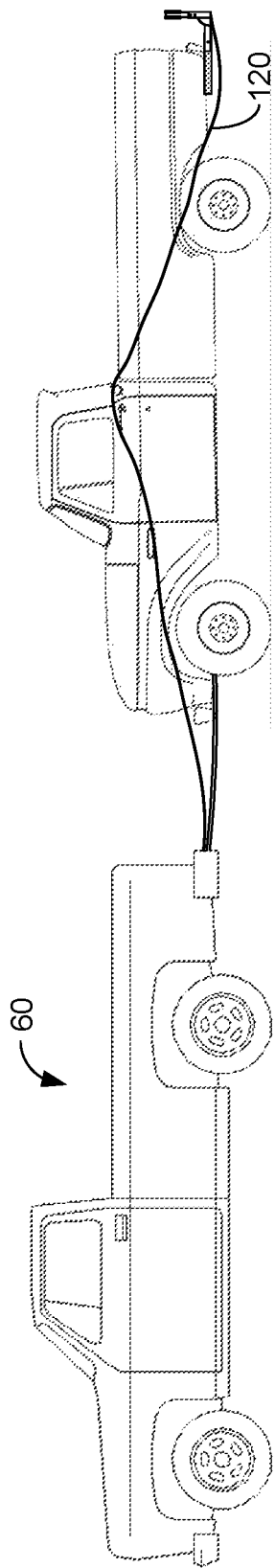

HITCH MOUNTED LIGHT ASSEMBLY

BACKGROUND

1. Field of the Invention

The present invention is related to the vehicle transportation safety field, specifically related to notifying drivers following a vehicle of the application of breaks and turn signaling.

2. Description of Related Art

Vehicles are a large part of society stemming from their usefulness in transportation, commuting, and entertainment. Vehicles are also machines that are subject to breaking down and the breakdowns do not always allow the operator to get the vehicle to a safe place. In these instances, the vehicle must be towed to a safe spot to be repaired. Over time, rules and regulations have been implemented to make using a vehicle and towing a vehicle safer. An example are lights that indicate the brakes have been applied and that the operator intends to move left or right.

An issue that commonly arises with the operation of a vehicle is that lights burn out or do not operate when being towed. This creates unsafe conditions on the roads. In an effort to resolve this problem, external lights can be added to the vehicle while it is operated or towed.

Historically, adding lights has been done by attaching the lights to the car by magnetism, suction, adhesive, or tying them on. Magnetism does not work on many new vehicles that are made of plastics and non-magnetic allows. Suction only works if a large enough flat spot on the vehicle can be found; which is also difficult on many aerodynamic vehicles, trucks, and vans. Adhesive wears out over time which could result in a light falling off the vehicle while it is being used or towed. And tying the lights on to the vehicle is also problematic. Many vehicles are not constructed so that lights can be safely and securely tied onto it. Additionally, it is difficult to place current towing lights in safe and secure spots on trucks and vans where those lights will meet traffic safety laws.

Although strides have been made to create a safe and secure method of attaching lights to a vehicle that does not have operational back lights, shortcomings remain. A new device is needed to allow the safe and secure attachments of external lights to a vehicle.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 7 is a side view of the hitch mounted light assembly of FIG. 1, in use by a towed vehicle.

FIG. 8 is an exemplary side view of the hitch mounted light assembly of FIG. 7, using an alternate embodiment where an assembly extension cord is used to reach the towing vehicle.

Figure 1:
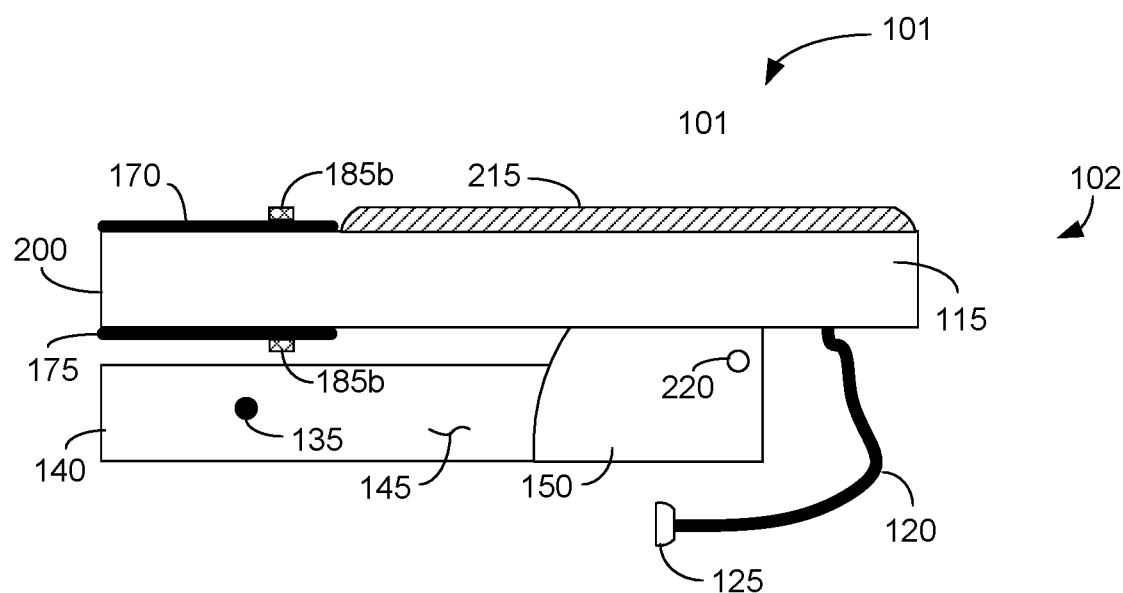
FIG. 1 is a side view of a hitch mounted light assembly according to an embodiment of the present application, in a first position.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The assembly and method in accordance with the present application overcomes one or more of the above-discussed problems commonly associated with traditional devices used to secure external vehicle traffic lights to a vehicle. In particular, the assembly is configured to attach to the hitch mount of a vehicle. The assembly is configured with two sets of vehicle rear lights. The assembly is further configured to fold up for storage purposes.

The assembly and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes a mounting bar configured to releasably communicate with the vehicle, a pair of traffic lights mounted each mounted to a bar, and a vertical bar to increase the elevation of the mounted traffic lights Additional features and functions of the device are illustrated and discussed below.

Figure 3:
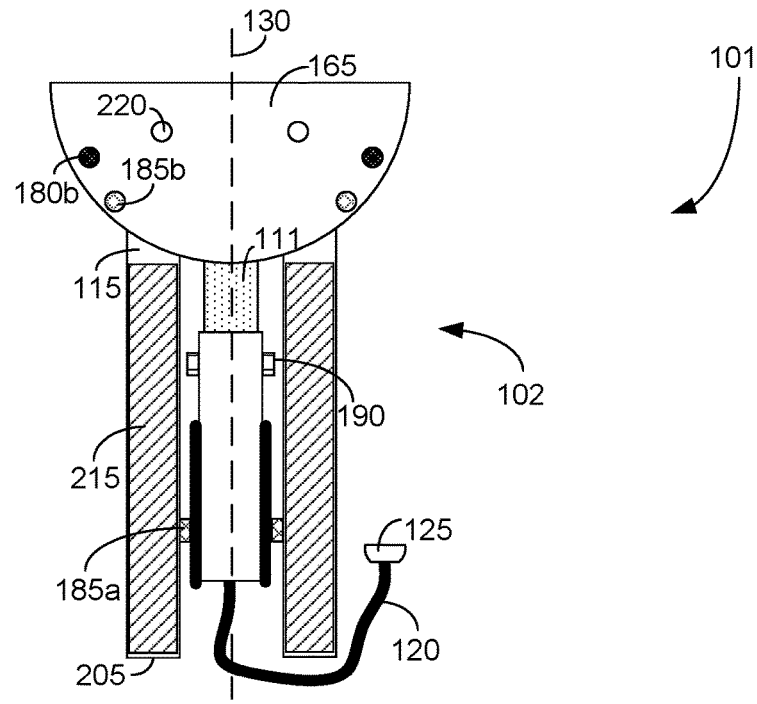
FIG. 3 is a rear view of the hitch mounted light assembly, in first position, of FIG. 1, in the first position.

Referring now to the drawings wherein like reference characters identify corresponding or similar elements in form and function throughout the several views. FIGS. 1 and 3 in the drawings illustrates a side view and a back view, respectively, of the hitch mounted light assembly 101 in a first position 102 for storage purposes. The assembly has a mounting bar 105, a vertical bar 110, a driver side arm 115, a passenger side arm 116, and an assembly electrical cord 120 which has a trailer wiring plug 125 at the opposite end from the assembly 101. Excluding the assembly electrical cord 120, the assembly 101 is symmetrical about an axis 130. For discussion purposes, we will focus on the driver half but it is understood that the passenger half is similar in form and function. While the mounting bar 105, the vertical bar 110, and the driver side arm 115 are illustrated as cuboid in shape, it is understood that the mounting bar 105, the vertical bar 110, and the driver side arm 115 could be constructed in any shape.

The mounting bar 105 is composed from rigid materials which may include metal or plastic. The mounting bar 105 has a securing hole 135, a front end 140, a driver side 145. A portion of the driver side 145 is in communication with a portion of a driver side web 150. The securing hole 135 is located adjacent to the front end 140, in the driver side 150, and is opposite the driver side web 150. In the first position 102, the mounting bar 105 is located adjacent to vertical bar 110. The vertical bar 110 and the driver side arm 115, are adjacent to each other with the driver side web 150 located between the vertical bar 110 and the driver side arm 115.

The vertical bar 110 has an upper bar 111, a lower bar 112, a vertical driver side 155, a vehicle side 160, and a traffic side 165. While the upper bar 111 and the lower bar 112 are illustrated as separate pieces of the vertical 110, it is understood that the vertical bar 110 can be one piece. While it is illustrated that the upper bar 111 selectively translates inside the lower bar 112 to adjust the elevation of the driver side arm 115, it is understood that the lower bar 112 may selectively translate inside upper bar 111.

The driver side web 150 is adjacent to the lower bar 112 of the vertical bar 110 and the driver side arm 115. The driver side web 150 has a pin hole 180a. the pin hole 180a is configured to provide a way in which to secure the mounting bar 105 in place while assembly 101 is in a second position 103 [as seen in FIGS. 2 and 4]

The vertical bar 110 supports the driver side arm 115. A portion of a traffic side web 170 is in communication with a portion of the traffic side 160. A portion of a vehicle side web 175 is in communication with a portion of the vehicle side 160. It is understood that the traffic side web 170 and the vehicle side web 175 will have common design features that are used together and the common features on the traffic side web 170 will be shown in the figures. The traffic side web 170 and the vehicle side web 175 have a pin hole 180b located so that a locking pin 185a secures driver side arm 115 when in is in the second position 103 [as seen in FIGS. 2 and 4]. It is understood that the driver side arm 115 can rest on the locking pin 185a, or locking pin 185a can translate through a portion driver side arm 115, such that driver side arm will remain in the second position 103.

Figure 2:
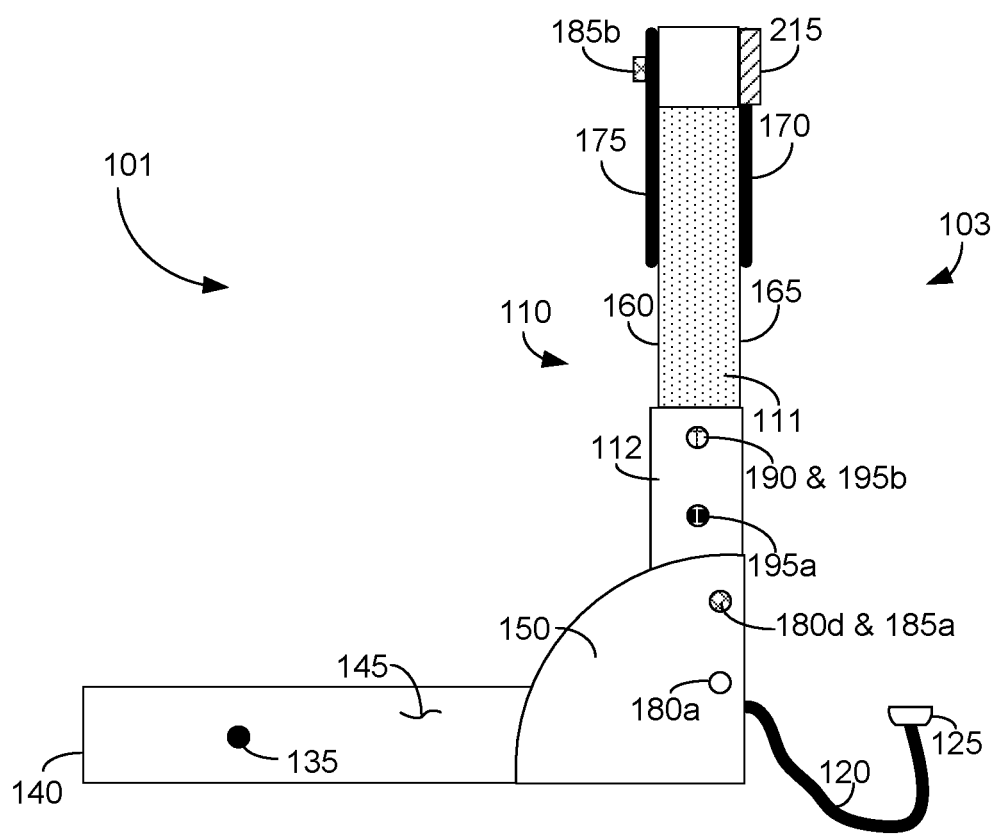
FIG. 2 is a side view of the hitch mounted light assembly of FIG. 1, in a second position.
Figure 4:
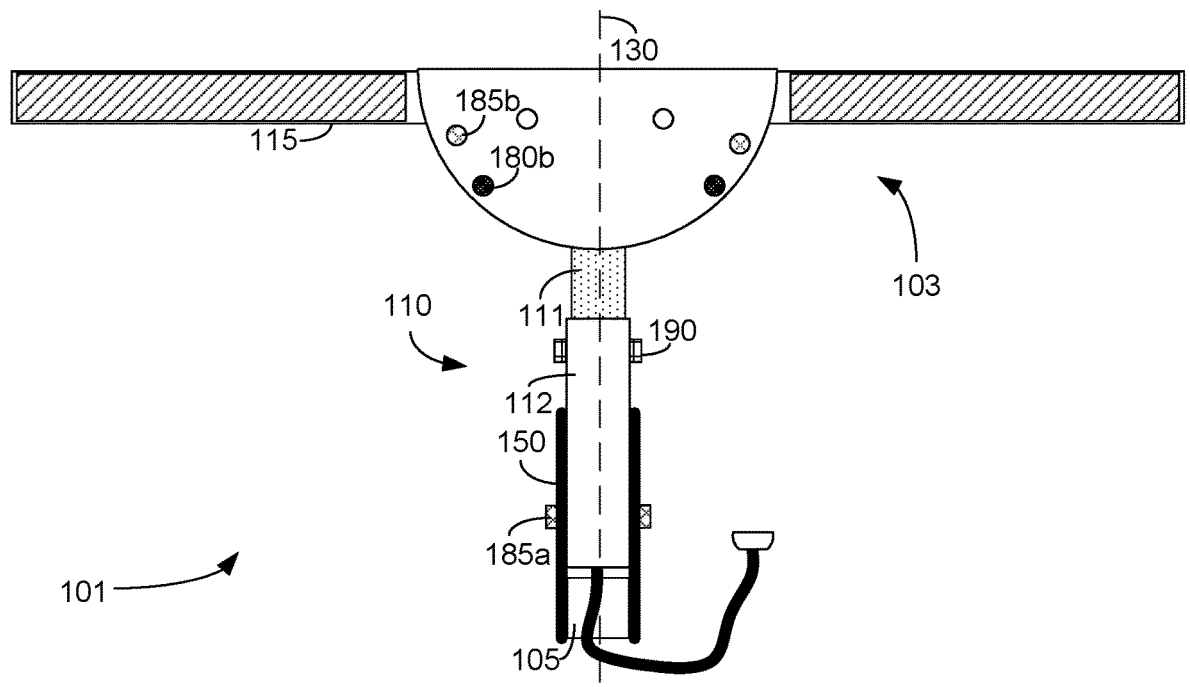
FIG. 4 is a rear view of the hitch mounted light assembly of FIG. 1, in the second position.

The traffic side web 170 and the vehicle side web 175 may also have a pin hole 180c (as seen in FIGS. 2 and 4) located so that the driver side arm 115 can be secured in the first position through the use of locking pin 185a. Locking pin 185a can be selectively locked. It is understood that the selective locking may be accomplished through any method commonly used in the industry [e.g. nut and bolt and hitch clip].

Figure 5:
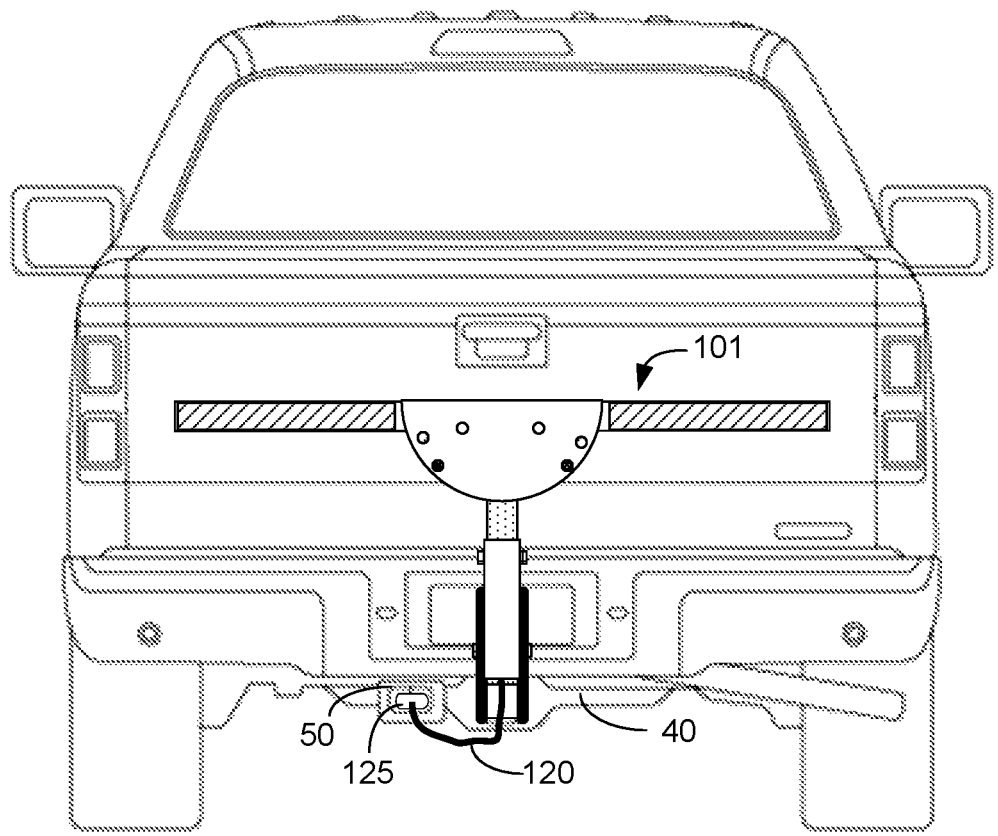
FIG. 5 is a rear view of the hitch mounted light assembly in of FIG. 1, mounted on a vehicle and in the second position.

The driver side arm 115 is located between a portion of the traffic side web 170 and the vehicle side web 175. In first position 102, the driver side arm 115 is located adjacent to vertical driver side 155. The driver side arm 115 has a driver side pivot end 200, a driver side end 205, and a driver traffic light side 210. The driver side pivot end 200 is opposite the driver side end 205. A set of traffic lights 215 covers a portion of the driver traffic light side 210 adjacent to the driver side end 205. The set of traffic lights 215 obtains power when the assembly electrical cord 120 and the trailer wiring plug 125 are in electrical communication with a vehicle wiring socket 50 [as seen in FIG. 5]. The set of traffic lights 215 is represented as a single bar of lights, but it is understood that the lights may include various different formats of lights. Also, the bulbs within the set of traffic lights 215 may be comprised of any bulbs available in the market place [e.g. incandescent, LED, and CFL]. The set of traffic lights 215 may be secured to the driver side arm 115 through any method available in the industry [e.g. magnets, screws, epoxy]. The set of traffic lights 215, when in proper use, provide proper traffic signals which may include vehicle braking and turn signaling.

The assembly electrical cord 120 is in communication with the trailer wiring plug 125. The assembly electrical cord 120 can be configured as any length; as an example, the assembly electrical cord 120 may be more than one foot long but less than thirty feet long. While it is illustrated that the assembly electrical cord 120 is in communication with assembly 101 through the vertical bar 110, it is understood that the assembly electrical cord 120 may communicate with the assembly 101 in any area of the assembly 101.

Referring now also to FIGS. 2 and 4 in the drawings, a side view and a back view, respectively, of the hitch mounted lighting assembly 101 in the second position 103. The assembly 101 is ready for use when in the second position 103. In second position 103, the vertical bar 110 pivots around a vertical bar axis 220. The vertical bar axis 220 is in communication with the driver side web 150. The vertical bar is secured into the second position 103 by transitioning a locking pin 185b through the pin hole 180a in the driver side web and through a pin hole 180d [shown with locking pin 185b]. the pin hole 180d is located in the lower bar 112.

The driver side arm 115 pivots about a driver side axis 225 and is secured by translating the locking pin 185a through pin hole 180. The driver side axis 225 is adjacent to the driver side pivot end 205. The elevation of the driver side arm 115 is secured through the use of a locking rod 190 which is translated through a locking hole 195a or a locking hole 195b [shown with the locking rod 190 in place] in both the upper bar 111 and the lower bar 112. The locking rod 190 can be selectively locked through the use of any item commonly used in the industry [e.g. nut and bolt and hitch clip].

Figure 6:
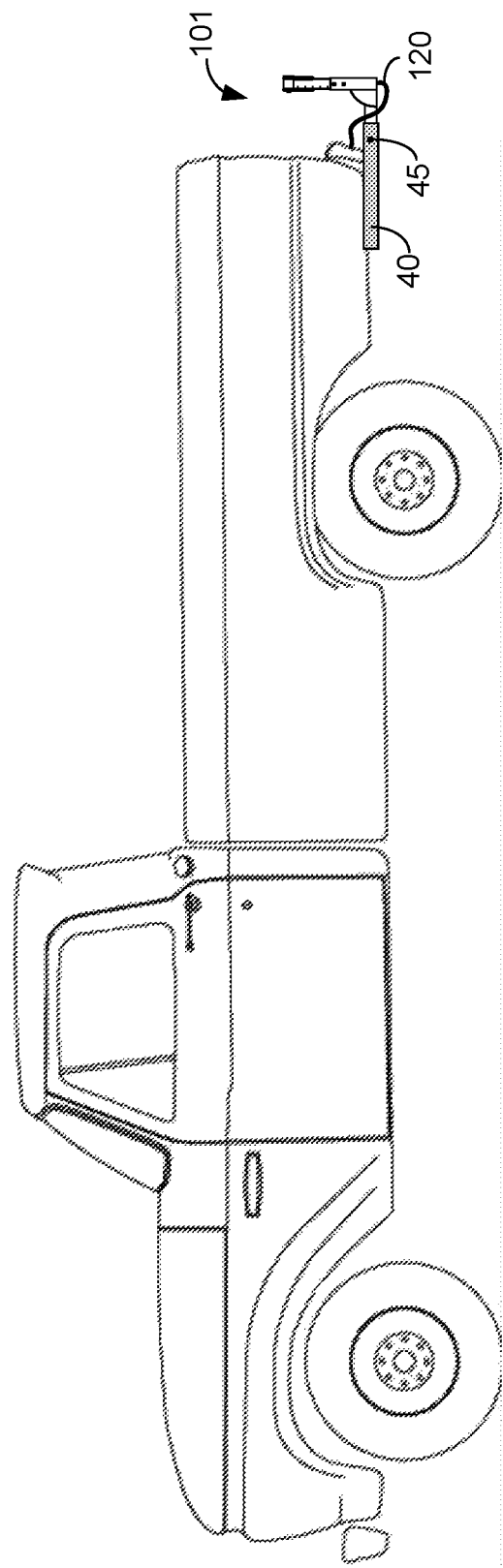
FIG. 6 is a side view of the hitch mounted light assembly of FIG. 1, mounted to the vehicle, in the second position.

Referring now also to FIGS. 5-6 in the drawings, a back view and side view, respectively, of the assembly 101 in use. The front end 140 of mounting bar 105 can be selectively translated into the vehicle trailer hitch 40 such that the front end is in releasable communication with the vehicle trailer hitch 40. A trailer hitch pin 45 is used to secure the assembly 101 to the vehicle trailer hitch 40.

Referring now also to FIG. 7 in the drawings, a side view of the assembly 101 wherein the assembly electrical cord 120 extends to, and is in electrical communication with, a tow vehicle 60.

Referring now also to FIG. 8 in the drawings, a side view of the assembly 101 wherein an assembly extension cord 320 is used. The assembly extension cord 320 is in communication with an assembly extension cord socket 325. In use, the assembly extension cord socket 325 is translated into the trailer wiring plug 125 such that both are in communication with each other. The assembly extension cord 320 is then extended to, and is in electrical communication with, the tow vehicle 60.

Figure 9:
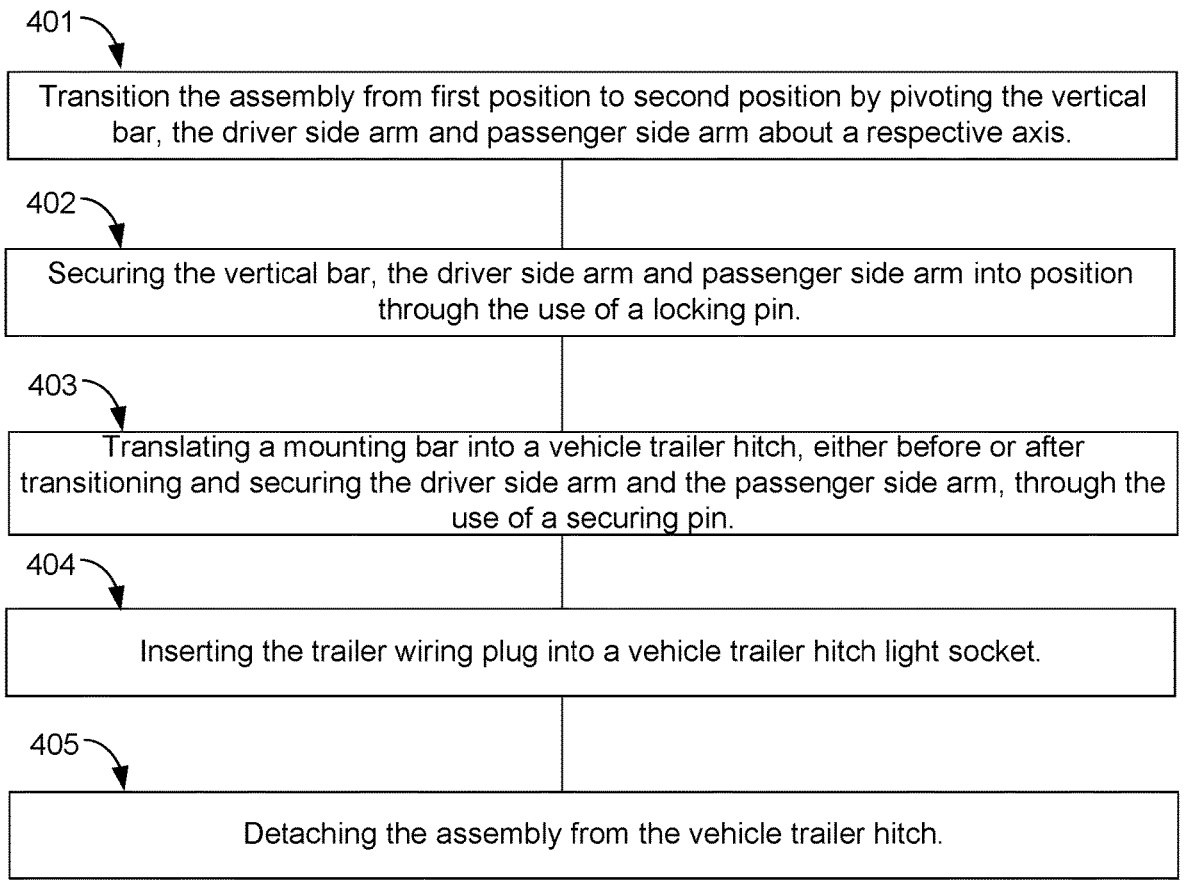
FIG. 9 is a chart of a method of steps used with the hitch mounted light assembly of FIG. 1.

Referring now also to FIG. 9, a method of steps used with the hitch mounted light assembly. Step 401, the assembly needs to be placed in a second position. This requires that a driver side arm and a passenger side arm are secured such that they are no longer adjacent to a vertical bar. Additionally, the vertical bar is secured such that it is no longer adjacent to a mounting bar. Step 402, securing the driver side arm, the passenger side arm, and the vertical bar involves transitioning pins into pre-set holes in the assembly. Step 403, the mount bar is translated into the vehicle trailer hitch and secured through the use of the vehicle trailer hitch's securing pin. It is understood that the assembly can be secured to the vehicle trailer hitch prior to transitioning the driver side arm and the passenger side arm into the second position. Step 404, a trailer wiring plug from the assembly is plugged into the vehicle trailer hitch light socket. Step 405, after use, detach the assembly from the vehicle trailer hitch.

The current application has many advantages over the prior art including at least the following: (1) a hitch mounted light assembly for vehicles with rear lighting that does not meet traffic requirements; (2) the ability to provide rear lights on a vehicle by using a vehicle's trailer lights plug; and (3) the ability to place towing lights at the rear of the vehicle.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A hitch mounted light assembly for communication with a vehicle, comprising:
   a mounting bar is configured to releasably communicate with the vehicle;
   a vertical bar pivotally coupled to the mounting bar, the vertical bar pivots about a vertical bar axis which allows a change from a first position to a second position;
   a plurality of extendable and pivotable side arms coupled to the vertical bar, the plurality of arms pivot about an axis to transition between a first position and a second position;
   a set of vehicle traffic lights in communication with the plurality of extendable and pivotable side arms; and
   an electrical cord extending from the vehicle traffic lights for engagement with a trailer wiring plug on the vehicle.

2. The assembly of claim 1, wherein the mounting bar is in releasable communication with a vehicle trailer hitch.

3. The assembly of claim 1, wherein a securing hole on the mounting bar is adjacent to the front end.

4. The assembly of claim 1, wherein a vertical bar axis is located in a lower bar.

5. The assembly of claim 1, wherein a driver side axis is adjacent to a driver side pivot end.

6. The assembly of claim 1, wherein a passenger side axis is adjacent to a passenger side pivot end.

7. The assembly of claim 1, wherein the vertical bar has an adjustable length.

8. The assembly of claim 7, wherein the vertical bar has an upper bar end and a lower bar end, the upper bar end transitions inside the lower bar end.

9. The assembly of claim 7, wherein the vertical bar has an upper bar end and a lower bar end, the lower bar end transitions inside the upper bar end.

10. The assembly of claim 1, wherein the electrical cord has a length that is greater than one foot.

11. The assembly of claim 1, wherein the electrical cord has a length that is less than 30 feet.

12. A method of mounting a hitch mounted light assembly, comprising:
    transitioning a vertical bar, a driver side arm, and a passenger side arm from a first position to a second position;
    securing the vertical bar, the driver side arm, and the passenger side arm into position through a locking pin;
    locating a mounting bar within a hitch of a vehicle, the mount including a front end that releasably transitions into the hitch of the vehicle; and
    inserting the trailer wiring plug into a trailer light hitch socket of the vehicle trailer hitch.

13. The method of claim 12, further comprising:
    transitioning the driver side arm and passenger side arm from first position to second position after locating the mounting bar within the vehicle trailer hitch.

14. The method of claim 12, further comprising:
    inserting the trailer wiring plug into an assembly extension cord socket.

15. The method of claim 12, further comprising:
    inserting an assembly extension cord plug into the vehicle trailer hitch light socket.

16. The method of claim 12, further comprising:
    detaching the assembly from the hitch of the vehicle.

* * * * *